United States Patent [19]

Carney

[11] Patent Number: 5,626,960
[45] Date of Patent: May 6, 1997

[54] SPANDEX CONTAINING A HUNTITE AND HYDROMAGNESITE ADDITIVE

[75] Inventor: Thomas E. Carney, Waynesboro, Va.

[73] Assignee: E. I. Du Pont de Nemours and Company, Wilmington, Del.

[21] Appl. No.: 518,148

[22] Filed: Sep. 7, 1995

[51] Int. Cl.⁶ .................. D02G 3/00; D01F 6/00
[52] U.S. Cl. ............. 428/372; 428/364; 428/394; 428/395; 264/204; 264/205
[58] Field of Search .............. 428/372, 364, 428/394, 395; 264/204, 205

[56] References Cited

U.S. PATENT DOCUMENTS

| | | | |
|---|---|---|---|
| 3,386,942 | 6/1968 | Bell et al. | 260/37 |
| 4,340,527 | 7/1982 | Martin | 524/432 |
| 4,499,221 | 2/1985 | Saitoh et al. | 524/109 |
| 4,504,612 | 3/1985 | Ketterer | 428/364 |
| 4,525,420 | 6/1985 | Imai et al. | 428/372 |
| 4,548,975 | 10/1985 | Lewis | 428/364 |
| 4,808,654 | 2/1989 | Rolfe et al. | 524/424 |
| 4,810,737 | 3/1989 | Dickerson | 524/251 |
| 5,000,899 | 3/1991 | Dreibelbis et al. | 428/364 |
| 5,028,642 | 7/1991 | Goodrich et al. | 524/27 |
| 5,091,453 | 2/1992 | Davidson et al. | 524/269 |
| 5,215,581 | 6/1993 | Stewart et al. | 106/471 |
| 5,298,547 | 3/1994 | Gareiss et al. | 524/425 |
| 5,464,894 | 11/1995 | Gareiss et al. | 524/424 |

FOREIGN PATENT DOCUMENTS

| | | | |
|---|---|---|---|
| 0489395A1 | 6/1992 | European Pat. Off. | D06P 1/651 |
| 59-133248 | 7/1984 | Japan | C08L 75/04 |
| WO94/29499 | 12/1994 | WIPO | D01F 6/70 |

*Primary Examiner*—Patrick Ryan
*Assistant Examiner*—J. M. Gray

[57] ABSTRACT

Spandex having dispersed within it particles of a mineral mixture of huntite and hydromagnesite has decreased tackiness, increased resistance to chlorine-induced degradation, satisfactory process continuity and little extraction of the mineral mixture in typical acid scouring and dyeing operations. The particles do not lead to excessive abrasiveness and are environmentally acceptable in effluent streams.

6 Claims, No Drawings

SPANDEX CONTAINING A HUNTITE AND HYDROMAGNESITE ADDITIVE

BACKGROUND OF THE INVENTION

1. Field of the Invention

This invention relates to a spandex in which a mineral additive is dispersed. More particularly, the invention concerns such spandex wherein the mineral additive is a mixture of huntite and hydromagnesite. The spandex of the invention has in combination decreased tackiness, increased resistance to chlorine-induced degradation, good operating continuity in dry spinning and satisfactory retention of the mineral additive during scouring and dyeing operations.

2. Description of the Prior

Spandex is defined generically as a manufactured filament or fiber in which the fiber-forming substance is a long chain synthetic polymer composed of at least 85% by weight of a segmented polyurethane. Usually spandex yarns are very elastic, but spandex yarns are also quite tacky compared to conventional "hard" fibers, such as of nylon or of polyester. The physical properties of spandex also are known to be detrimentally affected by exposure to chlorinated water, as for example in swimming pools.

Various methods have been suggested for ameliorating the problems associated with the high tackiness and low chlorine resistance of spandex elastic yarns. Some of the methods involve dispersing certain inorganic pigments in the spandex. For example, Goodrich et al, PCT application publication WO94/29,499, discloses that in addition to employing lubricating oils on the surface of the spandex, tackiness is further decreased by incorporating certain kinds of barium sulfate particles into the spandex. Martin, U.S. Pat. No. 4,340,527, discloses dispersing high purity, finely divided particles of zinc oxide in spandex to reduce chlorine-induced degradation. Dispersion of various carbonates, silicates, sulfates and oxides of group IIA metals in spandex is disclosed by Imai et al, U.S. Pat. No. 4,525,420, to improve the resistance of spandex to chlorine-induced deterioration. Japanese Patent Application Publication No. 59-133248 (Morifuji et al) and European Patent Application 0 489 395 (Ido et al) disclose that addition of oxides or hydroxides of magnesium, zinc or aluminum or hydrocalcite compounds of $Mg_xAl_y(OH)_2$ to spandex improves the resistance of the spandex to chlorine-induced deterioration. The incorporation of various inorganic particles into spandex as pigments or delustering agents is disclosed in Bell et al, U.S. Pat. No. 3,389,942.

Although the incorporation of the aforementioned inorganic particles into spandex is disclosed to provide certain positive effects, the particles also often cause certain problems. For example, the particles can plug filters and screens required in dry-spinning of the spandex and result in excessive interruptions in spinning continuity. Also, when incorporated in the spandex, the abrasiveness of the particles can cause excessive wear in parts of equipment typically used to incorporate spandex into fabric, for example, guides and knitting neeedles. In addition, some of the particles can be leached or extracted from the spandex by conventional acid scouring and dyeing operations and result in unwanted chemicals entering the effluent streams of textile plants as well as reduced effectiveness in the protection the particles were intended to provide. Accordingly, it is an object of the present invention is to provide a suitable additive for spandex that would avoid the above-recited shortcomings and still provide the spandex with decreased tackiness and increased resistance to chlorine-induced degradation.

SUMMARY OF THE INVENTION

The present invention provides a spandex containing an effective amount of a physical mixture of huntite and hydromagnesite mineral particles dispersed within the spandex. The mineral mixture is effective in decreasing the tackiness of the spandex and increasing the resistance of the spandex to chlorine-induced degradation. Typically, the mineral mixture is present in a concentration in the range of 1.5 to 5% of the weight of the spandex, though somewhat higher or lower concentrations sometimes can be employed effectively. Preferably, the concentration is in the range of 2 to 4%, based on the weight of the spandex. Typically, the mixture of huntite and hydromagnesite comprises at least 35 weight percent huntite, preferably 50 to 95 weight percent huntite.

The present invention also provides a process for dry spinning spandex from a solution of a polyurethane polymer in a solvent for the polyurethane, wherein the process comprises forming a concentrated slurry of a mixture of huntite and hydromagnesite particles in a solvent, and optionally other conventional particulate and non-particulate additives, the particles amounting to 10 to 40% of the total weight of the slurry, milling the concentrated slurry to break up particle aggregates and agglomerates and to decrease the median particle size to less than 1 micron, preferably to less than 0.5 microns incorporating the concentrated slurry into a polyurethane solution in an amount sufficient to provide a mixture of huntite and hydromagnesite particles amounting to 1.5 to 5% of the weight of polyurethane polymer, and dry spinning the solution into filaments.

DETAILED DESCRIPTION OF PREFERRED EMBODIMENTS

The following descriptions of preferred embodiments are intended to further illustrate the invention, but are not intended to limit its scope. The scope is defined by the appended claims.

For convenience, in the discussion and examples that are presented below, the following abbreviations may be used for the accompanying term:

PO4G Poly(tetramethyleneether)glycol.

MDI Methylene-bis(4-phenylisocyanate).

NCO Isocyanate end group.

EDA Ethylenediamine.

MPMD 2-methyl-1,5-diaminopentane.

HMPD 1,3-diaminocyclohexame, also called hydrogenated m-phenylenediamine.

DMAc N,N-dimethylacetamide solvent.

DEA Diethylamine.

CYANOX® 1790 1,3,5-tris(4-t-butyl-3-hydroxy-2,6-dimethyl-benzyl)-1,3,5-triazine-2,4,6(1H,3H,5H)trione antioxidant, sold by Cytec Industries.

"Methacrol 2462B" Polyurethane of t-butyldiethanolamine and 4,4'-methylene-bis(cyclohexylisocyanate), made by E.I. duPont de Nemours & Co.

Silicone oil A silicone oil of 96% poly(dimethylsiloxane) and 4% poly(diamylsiloxane).

KP-32 Anthraquinone dye (toner) sold by Sandoz.

The chemical composition of a polymer for the spandex also may be abbreviated. For example, a polyurethane made from a poly(tetramethyleneether)glycol ["PO4G"] having a number average molecular weight of 1800, methylene-bis (4-phenylisocyanate) ["MDI"] and a mixture of ethylene diamine ["EDA"] and 2-methyl-1,5-diaminopentane ["MPMD"] in a molar ratio of 90 to 10, may be abbreviated as:

PO4G(1800):MDI:EDA/MPMD(90/10).

Note that colons separate the monomers of the repeating units of the polymer, a slash (i.e.,/) between the diamines indicates that the diamines are in a mixture and parenthetic numbers immediately following the glycol and diamine mixture respectively, refer to the number average molecular weight of the glycol and the molar ratio of the diamines in the mixture.

In the descriptions and Examples that follow, various minerals are discussed. The art typically ascribes the following chemical compositions to the particular minerals discussed herein:

huntite $Mg_3Ca(CO_3)_4$.
hydromagnesite basic magnesium carbonate, usually written as $Mg_4(CO_3)_4 \cdot Mg(OH)_2 \cdot 4H_2O$.
dolomite $CaMg(CO_3)_2$.
calcite $CaCO_3$.
magnesite $MgCO_3$.

Each of the above-listed minerals generally is considered to be a non-hazardous material in effluent streams.

In accordance with the present invention, the spandex is formed from a polyurethane polymer that has dispersed within the polymer an effective amount of a particles of a mineral mixture of huntite and hydromagnesite. The particles of the mineral mixture are effective in decreasing the as-spun tackiness of the spandex (e.g., typically by at least 50%) and increasing the resistance of the spandex to chlorine-induced degradation (e.g., typically by at least 25%) as compared to the same spandex having no chlorine-resist or anti-tackiness agent present in the spandex. Typical effective concentrations of the mixture of huntite and hydromagnesite are in the range of 1.5 to 5% (based on the total weight of the as-spun spandex), though higher and lower concentrations of the huntite/hydromagnesite mixture can be effective. A concentration in the range of 2 to 4% is preferred.

Commercially available huntite/hydromagnesite mineral particles suitable for use in the present invention typically have a median size ("d(50)") that is smaller than 10 microns, preferably, smaller than 5 microns and most preferably in the range of 1 to 4 microns. However, further milling of the particles is necessary to assure good dry spinning continuity of spandex containing the mineral additive. Typically, the milled particles of all the minerals to be added to the spandex have a median particle size of less than 1 micron, preferably less than 0.7 micron. The MOH hardness of the huntite/hydromagnesite mineral is about 2.5. (The MOH hardness of other minerals used for comparison purposes in the Examples below is 3.5–4.5 for dolomite, 3 for calcite and 3.5–4.5 for magnesite.) The isoelectric point of the huntite/hydromagnesite mineral particles is typically in the range of about 7 to 8.5. The particles may be coated with specific agents for special purposes. For example, the particles can be coated with antimicrobial compositions such as those disclosed by Jacobson et al in U.S. Pat. No. 5,180,585. As long as the coating does not interfere with the decreased tackiness and increased chlorine resistance imparted to the spandex by the particles and does not detrimentally affect the tensile and elastic properties of the spandex produced therewith, such coated particles are suited for use in the present invention.

The huntite/hydromagnesite mineral particles can be incorporated into the spandex in the same manner as other conventional particulate additives are incorporated. Typically, a concentrated slurry of the particles, with or without other conventional additives, is prepared in a suitable solvent. For convenience, the same solvent is used for the slurry as is used to prepare the polyurethane polymer solution. In the concentrated slurties, the huntite/hydromagnesite and optional other particles typically amount to 10 to 40% of the total weight of the slurry. Prior to being mixed into the polymer solution, the concentrated slurry is thoroughly milled (e.g., in a ball mill, a sand mill, a media mill, etc.). Such milling breaks up agglomerates and aggregates and decreases the median size of the particles. Dispersing agents often are used during the milling. After milling, the flow of concentrated slurry is carefully metered into the polyurethane solution to provide the required concentration of additives in the dry spun spandex (e.g., a huntite/hydromagnesite additive concentration in the range of 1.5–5% based on weight of the total weight of the spandex to be dry spun).

Polymers conventionally used for dry-spinning into spandex are suitable for the spandex of the present invention. These polymers typically are prepared by known processes in which a polyether-based glycol or a polyester-based glycol is reacted with an organic diisocyanate to form an isocyanate-capped prepolymer which is then reacted with diamine chain extender to form a segmented polyurethane polymer.

Suitable glycols for making polyether-based spandex include PO4G, 3-methyl-1,5-pentane diol, tetrahydrofuran, 3 -methyltetrahydrofuran, and the like, and copolymers thereof. Suitable glycols for making polyester-based spandex include reaction products of (a) glycols, such as ethylene glycol, propylene glycol, butylene glycol, 2,2-dimethyl-1, 3-propane dioi and the like, and mixtures thereof, and (b) diacids, such as terephthalic acid, succinic acid, adipic acid, azelaicacid, sebacic acid, dodecanedioc acid and the like. Copolymers also are suitable. Also suited for use in making the polymers are polyetherester glycols comprised of portions of the above-described polyethers and polyesters, and diol-terminated polycarbonates such as poly(pentane-1,5-carbonate) diol and poly(hexane-1,6-carbonate) diol, and the like.

Organic diisocyanates suitable for preparing the capped prepolymers include MDI, 4,4'-methylene-bis(cyclohexyl-isocyanate), tolylene diisocyanate, 3,3,5-trimethyl-5-methylenecyclohexyl diisocyanate, hexamethylene diisocyanate, and the like.

Diamine chain extenders suitable for use in preparing the polyurethane polymer of the spandex include EDA, MPMD, 1,3-cyclohexane diamine, 1,4-cyclohexane diamine, 1,3-propylene diamine, 1,2-propylene diamine, and the like, and mixtures thereof.

The polymer of the spandex of the invention, in addition to particles of huntite/magnesite mineral, optionally may contain conventional agents for specific purposes, such as antioxidants, thermal stabilizers, UV stabilizers, pigments, dyes, lubricating and anti-tack agents and the like. Such agents can be added to the concentrated additive slurry which is then added to the polyurethane solution or can be added directly to the solution, prior to the dry-spinning of the spandex.

To dry spin the polyurethane, the polymer is dissolved in an inert organic solvent, such as N,N-dimethylacetamide (DMAc), N,N-dimethylformamide, N-methyl-pyrrolidone or the like. The polymer solution is dry-spun in conventional equipment through orifices into a shaft. Heated inert gas passes through the shaft to assist solvent evaporation from the surface of the formed filament as the filament passes through the shaft. Filaments from multiple orifices are twisted together to form a multifilament yarn (also referred to "coalesced" filaments). Lubricant can be deposited on the surface of the filaments by a conventional finish roll or by being co-spun with the filaments from the polymer solution, or by both methods. Thereafter, the thusly dry-spun spandex is wound up to form a yarn supply package.

TEST METHODS

The following test procedures were used for measuring various characteristics of the mineral particles and spandex yarns described herein.

"d(50)" is the mean particle size and "d(90)" is the ninetieth percentile particle size (i.e., 90% of the particles in the particle size distribution smallest are smaller than the d(90). Particle size distributions, which are reported herein as volumetric distributions (not number distributions) were determined with dilute concentrations of the particles in DMAc by means of a laser light scattering instrument, a Microtrac Model X100, manufactured by Leeds & Northrup Co., of St. Petersburg, Fla.

Average crystallite size was measured by the general X-ray diffraction techniques described by Klug and Alexander, "X-Ray Diffraction Procedures", John Wiley & Sons, (1974) p. 687–704. The measurements reported herein were made with Philips Automated Powder Diffractometer, Model PW-1710, having two diffractometer systems mounted on one tube tower.

Specific surface area in square meters per gram of the mineral particles was determined from nitrogen adsorption measurements in accordance with the general method of Brunnauer, Emmett and Teller (BET). The measurements were made with a Model 2100 Surface Area and Pore Volume Analyzer sold by Micromeritics Instruments Corp. of Norcross, Ga. The test samples were conditioned for about 10 hours under a vacuum of about 0.025 mm of mercury while at a temperature of about 120° C. During testing, the instrument automatically measured a series of points during each adsorption-desorption cycle. From these data, the BET surface area, the individual pore sizes and the average pore size were calculated.

Isoelectric point, which usually expressed as a pH, is defined as the concentration of hydrogen ions and other ions at which particles in water have no net charge and the zeta potential is zero. The isoelectric point was measured as follows. A 20-gram sample of the mineral particles in 200 ml of a 0.001N potassium nitrate solution was titrated with 3N potassium hydroxide or with 2N nitric acid, depending on whether acid or base was needed in the titration. Prior to the titration, the sample was thoroughly dispersed in the liquid by means of a sonic mixer, a Sonicator Model W-385, sold by Heat Systems-Ultrasonics Corp. of Farmingdale, N.Y. Each titration was performed with the sample being stirred constantly. A potentiometric titration meter, an ESA-8000 System Model MBS-8000, sold by Matec Applied Science Inc. of Hopkinton, Mass., was used for the titration. During the isoelecrric point determinations, the pH at which all the particles dissolved in the deionized water was also noted.

The elemental analysis with regard to concentrations of various elements, such as calcium, magnesium and silicon, in the bulk particles were performed by means inductively coupled plasma atomic emission spectroscopy with a model 34000B Applied Research Laboratories Instrument. In the instrument, a sample was aspirated into an ionized argon gas plasma at 10,000° C. to generate an intense emission spectrum. The intensity was measured with photo-multiplier tubes at discrete wavelengths. The measured intensities were then compared to corresponding intensities of a calibration standard to identify and measure the concentration of the elements in the sample. The concentration of the same elements on the surface of the particles was determined by energy dispersive X-ray analysis techniques with a Phillips Model 9900 EDS (beryllium window) instrument. The technique was also applied in measuring the concentration of elements at the surhce of a spandex yarn.

The tackiness of a sample of a spandex yarn containing a mineral additive was determined by an over-end take-off tension measurement, in accordance with the procedure disclosed in Hanzel et al, U.S. Pat. No. 4,296,174, column 4, lines 20–46. In accordance with this technique, measurement were made of the average force required to remove a 183-meter long sample of spandex yarn from a supply package of the yarn at a delivery rate of 45.7 meters per minute. The measurement was made on windings of the spandex located no further than about ⅛ inch (3 mm) from the surhce of the core on which the spandex is wound.

The surface roughness of spandex samples were measured at an 80X magnification by means of a scanning optical profilometer, a WYCO RST instrument, made by WYKO Co. of Tuscon, Ariz. The instrument was run in a phase-shifting mode. Topographical features were measured for 10-by-50-micron areas with a vertical resolution of a few Angstroms and a lateral resolution of 0.4 micron. The results were reported in terms of an root mean square roughness (in nanometers).

To measure the resistance of spandex samples to chlorine induced degradation, a 5-cm long loop of 44-dtex, 4-coalesced-filament spandex yarn was subjected to tension imposed by a 10 gram weight suspended from the sample and exposed to chlorinated water containing 3.5 ppm of active chlorine at 25° C. and pH 7.6. Prior to the exposure, test the sample was scoured, heat set for 60 seconds at 190° C. and mock dyed at pH 4.0 for 60 minutes. The hours of exposure until the sample broke was measured. At least four determinations were averaged per sample.

The operating continuity in dry spinning of spandex samples containing various additives was evaluated in the spinning tests described in the Examples. The spinning continuity was rated on a scale of 1 to 4, with 1 being excellent, 2 satisfactory, 3 poor and 4 unacceptable. The ability of the various samples to provide spinning continuity also was rated by means of a filter pluggage test. This test employed an filter apparatus which comprised a metal pipe of 1.75-inch (4.4-cm) diameter and 18-inch (46-cm) length. The pipe was threaded on each end and was held in a vertical position. The lower end of the pipe was sealed with a metal cap that had a centrally located, 0.5-inch (0.25-cm) diameter opening. Atop the opening were placed in succession from bottom up, (a) a set of three metal screens, the bottom one being of 20 mesh, the middle one being of 200 mesh, and the top one being a 200×1400 mesh, Dutch Twill woven screen having a retention rating of 12 microns, and (b) a cardboard gasket having a 1-inch (2.54-cm) diameter, centrally located opening therein. The gasket formed a pressure tight seal between the bottom cap and the pipe and set the cross-sectional area of the outlet of the apparatus. The upper end of the pipe was sealed with a metal cap which had an inlet connected to a high pressure air line. The test was conducted by placing 500 grams of concentrated slurry, having a composition as described in the Examples below, into the pipe, screwing on the top cap to make a tight seal, applying a pressure of 80 psig (550 kiloPascals) through the air inlet to force the slurry to flow out of the pipe into a container. When the flow stopped completely, the quantity of slurry collected in the container was weighed. The weight of slurry collected in the container downstream of the filter, correlated directly with the operating continuity of the dry spinning process. The more slurry that was collected, the better was the operating continuity in dry spinning.

To determine the amount of a specific mineral additive that was retained in the spandex after the spandex had been incorporated into a fabric and the fabric had been scoured and dyed, an elemental analysis of the spandex was made before and after the following scouring and dyeing procedure. The scouring and dyeing were performed in a Ahiba Texomat GVIB dyeing bath equipment (manufactured by Salvis AG, of Lucerne, Switzerland). All steps were carried out with a 40:1 weight ratio of bath liquor to fabric. Fabric samples were produced in the form of circular knit tubing on a Model FAK Lawson Knitting Unit (made by Lawson-Hemplhill Company) with spandex yarns and nylon yarns. Each knit fabric sample was placed in a "pre-scour" aqueous bath containing 2 grams per liter of detergent and 0.5 gram per liter of tetrasodium pyrophosphate. The bath temperature was raised at a rate of 3° F. (1.7° C.) per minute from 80° F. (17° C.) to 140° F. (80° C.), held at that temperature for 20 minutes and then allowed to cool to 80° F. (17° C.), at which time the sample was with rinsed with tap water until the effluent water was clear. The sample was then exposed in a second aqueous bath containing 3 g/l of detergent, 0.5 g/l of monosodium phosphate, defoamer amounting to 0.5% owf (based on weight of the fabric), leveling agent amounting to 1.0% owf, and premetallized black dye amounting to 3.0% owf. The second bath temperature was raised at a rate of 3° F. (1.7° C.) per minute from 80° F. (17° C.) to 140° F. (80° C.), held at that temperature for 15 minutes, raised further at a rate of 2° F./min (1.1° C./min) to 200° F. (93.3° C.), held at that temperature for 20 minutes, and then cooled to 140° F. (80° C.), at which temperature acetic acid was added to the bath to provide a concentration of 0.5 g of acetic acid per liter of bath liquor and a pH of about 4.35. The bath temperature was then raised again at a rate of 2° F./min (1.1° C./min) to 200° F. (93.3° C.), held at that temperature for 30 minutes, and then cooled to 80° F. (17° C.). The sample was then rinsed with tap water until the effluent water was clear and thereafter subjected to a third (final) bath which contained 2.0% owf of fixing agent, 0.5% owf of leveling agent and 0.38 gram/liter of acetic acid. The pH was about 4.8. The third bath temperature was raised at a rate of 4° F. (2.2° C.) per minute from 80° F. (17° C.) to 160° F. (91° C.), held at that temperature for 20 minutes, and then cooled to 80° F. (17° C.). In each of the baths, the bath liquor and the fabric sample were thoroughly agitated. The sample was then rinsed with tap water and allowed to dry in air. Comparison of the elemental analysis of the sample before and after exposure to the scouring and dyeing treatment permitted calculation of the percentages of the minerals retained in the spandex.

EXAMPLES

In the Examples below, spandex samples were prepared with various carbonate mineral additives. Samples of the invention are designated with Arabic numerals. Comparison samples are designated with upper case letters. The particular carbonate minerals used to prepare the spandex samples of the examples were as follows. Table I, below, summarizes the characteristics of the carbonate minerals.

M1 is a 50/50 huntite/hydromagnesite mineral mixture, Ultracarb U3, sold by Microfine Minerals Ltd. of Derby, England.

M2 is a 95/5 huntite/hydromagnesite mineral mixture, Ultrascarb HU5, sold by Microfine Minerals Ltd.

M3 is a 50/50 huntite/hydromagnesite mineral mixture, Ultracarb UF, sold by Microfine Minerals Ltd. (same as M1, but finer particles).

M4 is a precipitated basic magnesium carbonate, MAGCHEM® BMC-2, sold by Martin Marietta Magnesia Specialties, Inc., of Hunt Valley, Md.

M5 is a limestone (calcium carbonate), Vicron 15—15, sold by Specialty Minerals, Inc., of Adams, Mass.

M6 is Dolomite D307 sold by National Mineral Products of Salinas, Calif.

M7 is Magnesite 33-200 sold by Premier Services Corp. of Middleburg Heights, Ohio.

TABLE I

| Mineral | Characteristics of Mineral Additives | | | | | | |
| --- | --- | --- | --- | --- | --- | --- | --- |
| | M1 | M2 | M3 | M4 | M5 | M6 | M7 |
| Crystallite size[1], Å | | | | | | | |
| Component (a) | >2000 | >2000 | 1380 | 288 | 1372 | >2000 | >2000 |
| Component (b) | 960 | 750 | 910 | na[2] | na | na | na |
| Particle size, microns | | | | | | | |
| D(50) | 4.1 | 3.1 | 1.0 | 20.7 | 3.9 | 18.6 | 10.6 |
| D(90) | 11.1 | 9.1 | 3.1 | 39.1 | 11.0 | 41.6 | 34.7 |
| Specific surface area, m$^2$/g | 13.5 | 15.9 | 20.2 | 19.4 | 2.2 | 0.9 | 1.4 |
| Pore volume, cm$^3$/g | 0.038 | 0.065 | 0.057 | 0.049 | 0.008 | 0.002 | 0.007 |
| Average pore size, Å | 112 | 164 | 113 | 100 | 149 | 108 | 208 |
| Zeta potential pH | | | | | | | |
| Isoelectric point | 7.0 | 8.2 | 7.6 | nm | 5.2 | 6.5 | 8.2 |
| Mineral dissolved | 2.6 | 2.8 | 5.3 | nm | 5.2 | 5.7 | 4.6 |
| Elemental analysis[3] | | | | | | | |

Surface:

TABLE I-continued

| | Characteristics of Mineral Additives | | | | | | |
|---|---|---|---|---|---|---|---|
| Mineral | M1 | M2 | M3 | M4 | M5 | M6 | M7 |
| Wt. % Mg | 42 | 37 | 51 | 96 | na | 13 | 83 |
| Wt. % Ca | 56 | 62 | 46 | 4 | 100 | 87 | 12 |
| Wt. % Si | 1.9 | 0.9 | 1.7 | 0 | 0 | 0 | 2.4 |
| Ratio Mg/Ca | 0.75 | 0.60 | 1.1 | 24 | 0 | 0.15 | 6.9 |
| Average: | | | | | | | |
| Wt % Mg | 81 | 67 | 81 | 100 | na | 38 | 100 |
| Wt. % Ca | 17 | 31 | 17 | na | 100 | 62 | na |
| Wt. % Si | 2.1 | 1.2 | 2.0 | 0 | 0 | 0 | 0 |
| Ratio Mg/Ca | 4.8 | 2.2 | 4.8 | na | 0 | .61 | na |

Notes:
[1]Crystallite sizes are reported for the major component, labeled component (a), which for M1, M2 and M3, is huntite and component (b) is hydromagnesite.
[2]"na" means not applicable.
[3]In the elemental analyses, each weight percent of calcium, magnesium or silicon represents the % of the total weight of these three elements.

The concentrated slurries listed in Table II below were prepared with the carbonate minerals of Table I along with other additives as listed. The barium sulfate used in slurries S1 through S5 was micro-grade blanc fixe sold by Sachtleben of Duisberg-Hamburg, Germany. Prior to being combined with polymer solution, each slurry was milled in a 1.5-liter capacity horizontal media mill (a model HM-1.5, manufactured by Premier Mill Corp. of Reading, Pa.) with 0.8-mm-diameter glass beads being used as the milling medium. An 85% loading, a tip velocity of 60 meters per minute (2000 ft/min at the shaft spacer tips), a slurry throughput of 35 grams per minute and a product outlet temperature of 50° C. were employed.

TABLE II

| | Composition of Concentrated Slurries | | | | | |
|---|---|---|---|---|---|---|
| Slurry | S1 | S2 | S3 | S4 | S5 | S6 |
| Weight % of total slurry | | | | | | |
| Carbonate mineral | 0 | 19.8 | 18.4 | 10.7 | 15.3 | 24.0 |
| CYANOX ® 1790 | 13.6 | 7.4 | 8.7 | 16.0 | 11.5 | 9.1 |
| "Methacrol 2462B" | 4.5 | 2.5 | 2.9 | 5.3 | 3.8 | 3.0 |
| Silicone oil | 2.7 | 1.5 | 1.7 | 3.2 | 2.3 | 2.0 |
| Barium sulfate | 12.0 | 6.5 | 7.7 | 3.8 | 10.1 | 0 |
| Titanium dioxide | 3.0 | 1.6 | 1.9 | 3.5 | 2.5 | 2.0 |
| Polyurethane | 6.0 | 5.0 | 5.0 | 5.0 | 5.0 | 4.7 |
| DMAc solvent | 58.3 | 55.6 | 53.6 | 42.5 | 49.3 | 55.2 |
| Total % particles | 15.0 | 28.0 | 28.0 | 28.0 | 28.0 | 26.0 |

Slurries S1 through S5 were each combined with a solution of polyurethane Polymer A in DMAc to form a dry-spinning solution. Polymer A was prepared by reacting PO4G of 1800 number average molecular weight and MDI at a capping ratio (i.e., the molar ratio of MDI to PO4G) of 1.63 and a 2.40 weight % NCO, and then chain extending isocyanate-capped reaction product with a 90/10 mixture of EDA/MPMD. Diethylamine was employed as a chain terminator. The resultant PO4G(1800):MDI:EDA/MPMD(90/10) polymer was mixed with each of concentrated slurries S1 through S5 to provide a 36.5 weight percent concentration of Polymer A dry spinning solution. Slurry S6 was milled in a 50-liter capacity, Model PHM-50, horizontal media mill made by Draiswerke Inc., of Allentown, N.J., with 0.8–1.0 mm diameter zirconium silicate beads, at 85% loading and a throughput of 1.82 Kg/min in two passes with recycle, followed by one pass without recyle at 1.36 Kg/min, with an outlet temperature of 52° C. Concentrated slurry S6 was combined with Polymer B, a PO4G(1800):MDI:EDA/HMPD(90/10), that was prepared similarly to Polymer A but with a 2.65% NCO, a different diamine co-extender and an additional 125 parts per million of unsymmetrical dimethylhydrazine (UDMH) chain terminator. Polymer B solution was mixed with slurry S6 to provide a polymer concentration 37.4 weight percent in the dry spinning solution. The polymer solutions were then dry-spun, to provide the resultant spandex elastic yarns with the following common amounts of additives (based on the total weight of the spandex): CYANOX® 1790, 1.5%; "Methacrol 2462B", 0.5%; Silicone oil, 0.33%; titanium dioxide, 0.33% and 5 ppm of KP-32. All the spandex samples, except for the samples made with slurry S6 contained 1.3% of barium sulfate. Samples from slurry S6 contained no barium sulfate.

Each of the above-described solutions was dry spun into 4-coalesced-filament 44-dtex yarns in a conventional apparatus. Solution was metered through spinneret orifices into a spin shaft, in which the thusly spun solution formed filaments and DMAc solvent evaporated from the filaments. A concurrent flow of nitrogen gas was supplied to the shaft at a temperature of 390°–420° C., which resulted in a temperature of 220°–240° C. at the half-way point through the shaft. DMAc gas exited through a pipe in a side wall near the bottom of the shaft. The filaments were false-twisted by jets at the bottom of the shaft to cause groups of filaments to coalesce into single threadlines. A counter current flow of nitrogen, which was supplied at 135°–140° C. near the bottom of the shaft, combined with the exiting DMAc. The coalesced threadlines exited through the bottom of the shaft. A silicone oil finish lubricant was applied to the threadlines by a kiss roll applicator, to provide an add-on about 5% based on the weight of the threadline. Yarn was then wound up at 735–880 meters per minute.

Example I

In this example, twelve spandex samples, six of the invention and six comparison samples, were prepared as described above. The samples differed in the identity and concentration of the particular carbonate mineral dispersed in the spandex and the particular slurry employed to spin the spandex. All samples were made with polyurethane polymer A, except sample 1which was made with polyurethane polymer B. Comparison sample A contained no carbonate additive. Spandex samples 1, 2, 3 and 4 and comparison sample B contained a nominal 50/50 mineral mixture of huntite and hydromagnesite; sample 1 contained mineral M3 and samples 2, 3, 4 and B, mineral M1. Samples 5 and 6 contained mineral M2, a nominal 95/5 huntite/hydromagnesite mineral mixture. Comparison samples C, D, E and F respectively contained minerals M4 (basic magnesium carbonate), M5 (calcium carbonate), M6 (dolomite) and M7 (magnesite). The additives did not significantly affect tensile and elastic properties of the spandex. Table III summarizes results of filtration, spinning continuity and chlorine resistance tests of the samples and of tests of the ability of the samples to retain the minerals when exposed to scouring and dyeing procedures. The results show the samples of the invention containing effective amounts of huntite/hydromagnesite mineral mixtures to be superior to the samples containing other carbonate minerals.

Example II

This example illustrates the surprisingly large decrease in tackiness that is achieved when an effective amount of particles of a mineral mixture of huntite and hydromagnesite is dispersed within the polyurethane of a spandex in accordance with the invention. The tackiness is determined from average over-end take-off tension ("OET") measurements on wound up spandex yarn packages. In this example, the tackiness of four samples made with Polymer A by the procedures of Example I are compared. Samples 7 and 8 are of the invention. Samples A (from Example I) and sample G are comparison samples. The average over-end take-off tensions ("OET") of yarn packages made with the samples were measured with the samples as "freshly" spun and after oven aging. Oven aging was used to accelerate the increase in tackiness that typically occurs with spandex yarns when stored for long times (e.g., several months). The procedure by which the wound-up spandex yarn samples were aged

TABLE III

Spandex Test Samples

| Sample | Slurry | Carbonate Mineral | % | Particle Size microns‡ D(50) | D(90) | Ratings Filtration* | Spinning† | Chlorine resist^a Hrs. | Rating | % Mineral Retain[1] |
|---|---|---|---|---|---|---|---|---|---|---|
| 1 | S6 | M3 | 4.0 | 0.31 | 0.78 | >200 | 1 | 24.3 | 2.4 | nm |
| 2 | S2 | M1 | 4.0 | 0.48 | 2.00 | 29 | 2 | 24.4 | 2.3 | 95 |
| 3 | S3 | M1 | 3.2 | 0.28 | 0.75 | 98 | 2 | 44.3 | 4.2 | 90 |
| 4 | S5 | M1 | 2.0 | 0.57 | 3.03 | 23 | 2 | 17.7 | 1.7 | 88 |
| 5 | S5 | M2 | 2.0 | 0.52 | 2.75 | 13 | 2 | 15.5 | 1.5 | 93 |
| 6 | S3 | M2 | 3.2 | 0.66 | 3.07 | 21 | 2 | 34.0 | 3.2 | nm |
| A | S1 | 0 | 0 | 0.37 | 1.12 | 388 | 1 | 10.5 | 1.0 | na |
| B | S4 | M1 | 1.0 | 0.40 | 1.37 | 67 | 2 | 11.5 | 1.1 | 93 |
| C | S5 | M4 | 2.0 | 0.37 | 1.75 | 2 | 4 | 19.3 | 1.8 | 73 |
| D | S5 | M5 | 2.0 | 1.92 | 5.70 | 5 | 3 | 15.0 | 1.4 | 75 |
| E | S5 | M6 | 2.0 | 0.52 | 1.46 | 2 | 4 | 13.8 | 1.3 | 76 |
| F | S5 | M7 | 2.0 | 0.47 | 2.30 | 3 | 2 | 14.1 | 1.3 | 92 |

Notes:
[1]"na" means not applicable; "nm" means not measured.
‡ = particle sizes of all inorganic additives after milling.
* = filter flow-through test in grams.
† = qualitative spinnability rating.
^a chlorine-resist test hours to break with the rating normalized to sample A.

The above-summarized results demonstrate the superiority of the spandex samples of the invention over the comparison spandex samples. Although each of the carbonate minerals tested increased the resistance of the spandex to chlorine-induced degradation, the samples of the invention containing at least 2 weight % of the huntite/hydromagnesite mineral mixture were significantly more effective. The filtration test of comparison samples C, D, E and F, each containing a different carbonate mineral not of the invention, showed these samples to perform much poorer in filtration than did the samples of the invention. In addition, comparison sample F had an undesirable grey color. The spinning continuity of comparison samples C and E, respectively containing basic magnesium carbonate and dolomite, was unacceptable. The spinning continuity of comparison sample D, which contained calcium carbonate, was significantly inferior to the spinning continuity experienced with the samples of the invention. Note also the superiority of the samples of the invention in retaining the mineral mixture of huntite and hydromagnesite in the scouring and dyeing tests versus comparison samples C, D and E which respectively contained basic magnesium carbonate, calcium carbonate and dolomite.

was as follows. Within a day or two after spinning and windup, the wound-up samples were conditioned for 24 hours at 72° F. (22° C.) and 65% relative humidity; heated for 16 hours at 50° C. in a conventional forced air oven; cooled for another 24 hours; and then measured for tackiness (OET). The results of the OET measurements are summarized in Table IV, below. The samples differ in the weight percents of different inorganic particle additives dispersed within the yarns. Note that barium sulfate, which is disclosed in PCT WO 94/29,499 to decrease the tackiness of spandex significantly, is not included in every sample.

TABLE IV

Tackiness of Samples

| Sample | Of Invention 7 | 8 | Comparisons A | G |
|---|---|---|---|---|
| Wt. % Barium sulfate | 0 | 1.3 | 1.3 | 0 |
| Wt. % Titanium dioxide | 0.33 | 0.33 | 0.33 | 0 |
| Wt. % Ultracarb Mineral | 3.2* | 3.2† | 0 | 0 |

TABLE IV-continued

| | Tackiness of Samples | | | |
|---|---|---|---|---|
| | Of Invention | | Comparisons | |
| Sample | 7 | 8 | A | G |
| Surface roughness rms, nanometers | 50 | 53 | 22 | 12 |
| Tackiness, OET | | | | |
| As spun, centiNewtons | nm | 0.18 | 0.52 | 0.79 |
| Oven aged, cN | 0.40 | 0.41 | 0.68 | 0.86 |

Notes:
nm = no measurement.
*N1, Ultracarb U3.
† = M3, Ultracarb UF.

Comparison sample G, which contained no particulate additive was the most tacky sample, as indicated by the OET measurements. Compared to comparison sample G, comparison sample A which contained 1.3 weight percent of barium sulfate (based on the weight of the spandex) had a 34% lower as-spun OET and a 23% lower oven aged OET. Sample 8 of the invention, which contained both 1.3% of barium sulfate and 3.2 weight % of M3 (the mineral mixture of huntite and hydromagnesite of Ultracarb UF) had an as-spun OET that was less than one-quarter that of comparison sample G and less than 35% that of comparison sample A. Similarly the oven-aged sample 8 of the invention had an OET that was less than 50% of that of comparison sample G and about 60% of that of comparison sample A. Even more surprising was the result shown by sample 7 of the invention which had an oven aged tackiness that was just as low as that of sample 8, even though the spandex of sample 7 contained no barium sulfate at all. The surface roughness of the samples correlated quite well with the tackiness of the spandex. Longer, room-temperature, air aging tests substantiate the advantageous reduced tackiness of the spandex of the invention.

We claim:

1. A spandex containing particles of a mineral mixture of huntite and hydromagnesite dispersed within the spandex in an amount effective for decreasing the tackiness and increasing the chlorine-resistance of the spandex.

2. A spandex in accordance with claim 1 wherein the particles of the mineral mixture dispersed within the spandex are present in a concentration in the range of 1.5 to 5% by weight of the spandex.

3. A spandex in accordance with claim 2, wherein the concentration of the particles of the mineral mixture is in the range of 2 to 4%, by weight of the spandex.

4. A spandex in accordance with claim 1, 2 or 3 wherein the huntite amounts to at least 35 weight % percent of the mineral mixture of huntite and hydromagnesite.

5. A spandex in accordance with claim 4 wherein the huntite of the mineral mixture amounts to at least 95 weight percent of the mineral mixture.

6. A process for dry spinning spandex from a solution of a polyurethane polymer in a solvent for the polyurethane, wherein the process comprises forming a concentrated slurry of particles of a mineral mixture of huntite and hydromagnesite in a solvent, and optionally other conventional particulate and non-particulate additives, the particles amounting to 10 to 40% of the total weight of the slurry and the weight percent of huntite in the huntite/hydromagnesite mixture being at least 35%, milling the concentrated slurry to break up particle aggregates and agglomerates and decrease the median particle size to less than 1 micron, incorporating the concentrated slurry into a polyurethane solution in an amount sufficient to provide a concentration of huntite/hydromagnesite particles amounting to 1.5 to 5% of the weight of the filaments to be spun, and dry spinning the solution into filaments.

* * * * *